June 3, 1941.  R. HINTZE  2,243,903
ABSORPTION REFRIGERATING APPARATUS
Filed Nov. 26, 1938  2 Sheets-Sheet 1
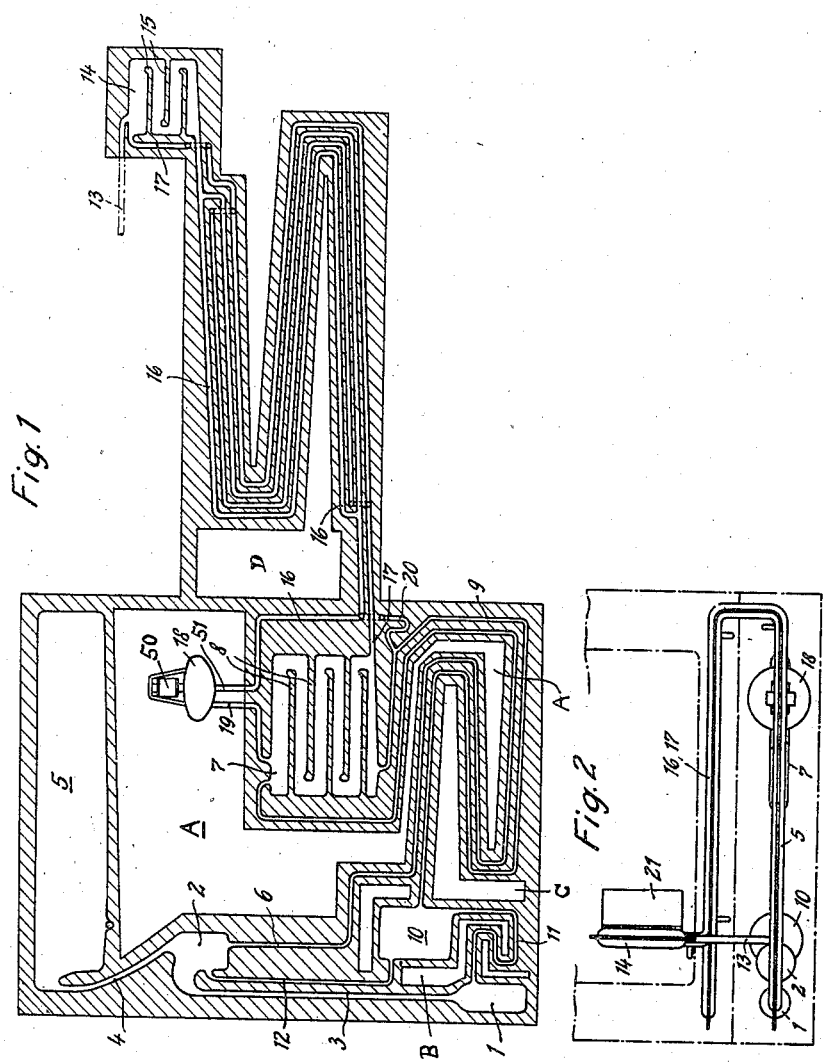

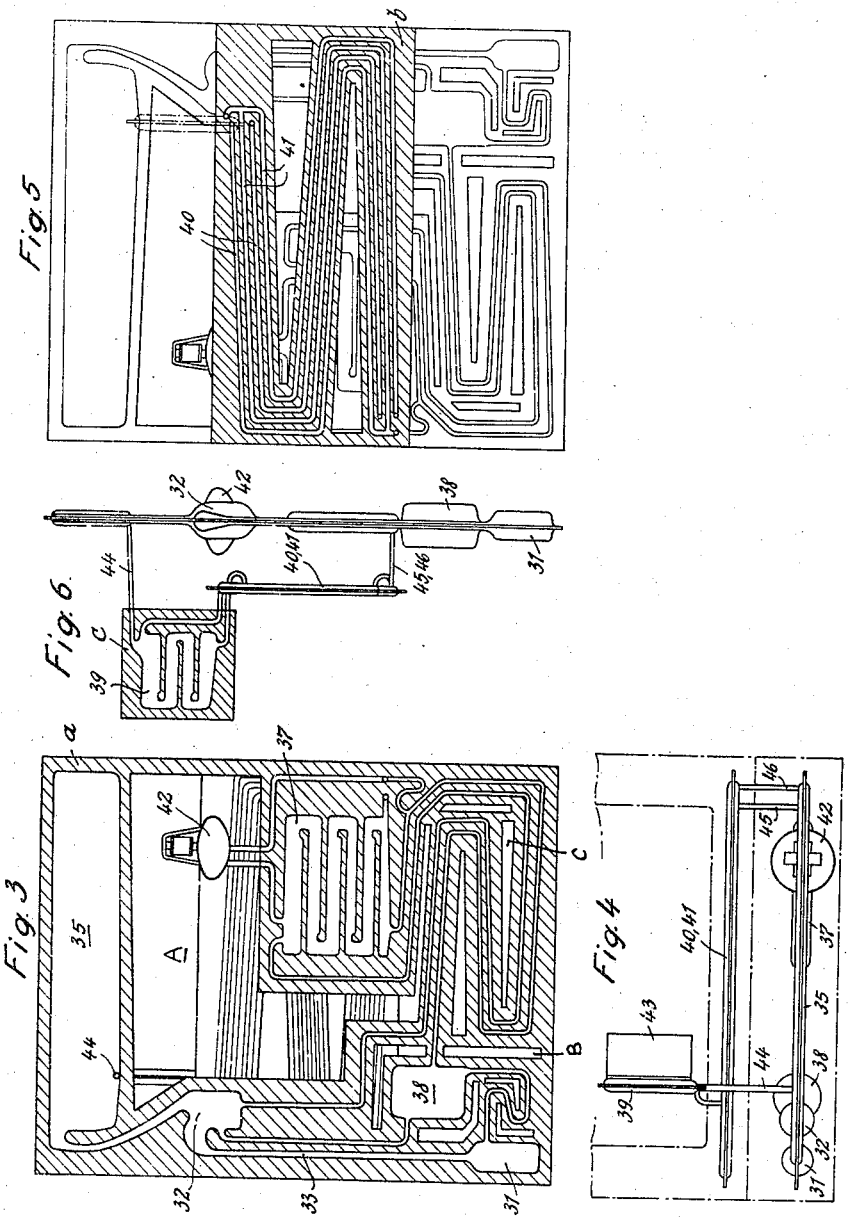

Patented June 3, 1941

2,243,903

UNITED STATES PATENT OFFICE 2,243,903

ABSORPTION REFRIGERATING APPARATUS

Rudolf Hintze, Berlin-Charlottenburg, Germany, assignor to Patentvertungs-Gesellschaft mit beschränkter Haftung "Hermes," Berlin, Germany, a corporation of Germany Application November 26, 1938, Serial No. 242,495
In Germany November 29, 1937

6 Claims. (Cl. 62—119.5)

The present invention relates to absorption refrigerating apparatus, more particularly to absorption refrigerating apparatus of the continuous type, and consists in such an apparatus in which the vessels and intermediate conduits serving to receive and convey the operating media are formed of indented and corrugated metal sheets arranged in pairs and hermetically united with each other, for instance, by welding them together at the points free of indentations and corrugations.

It is known to compose the condenser of refrigerating apparatus of the compression type of two corrugated metal sheets which are so welded together that the corrugations form a conduit for the vaporous refrigerant to be condensed. It is also known to form the evaporator of such refrigerating apparatus of two substantially plain sheets welded together face to face and having corrugations which form the evaporator system proper. In contradistinction thereto, the invention does not deal with one or the other individual element or vessel of a refrigerating apparatus, but comprises a complete absorption refrigerating apparatus of the continuous type, i. e. the generator, absorber, condenser, evaporator and other vessels serving to receive and to convey the operating media inclusive of the conduits (if any) interconnecting these elements. Thus the entire system is formed by the depressions of metal sheets arranged face to face together. In this manner, all or the majority of the vessels may be made of very few metal sheets. As a result a very small number of stamping tools are required, which simplifies the production and improves its economy. The invention thus is especially favorable for the mass production of absorption refrigerating apparatus.

An absorption refrigerating apparatus of the continuous type without pumps and valves comprises at least four main vessels which are in open communication with one another through fluid conduits, namely a generator, a condenser, an evaporator, and an absorber. If an inert gas circulating through the evaporator and absorber is employed for equalizing the difference in pressure prevailing on the one hand in the evaporator and absorber, and on the other hand in the condenser and generator, a gas heat exchanger is preferably arranged in the circuit of the auxiliary gas. It is further advantageous to design the conduits carrying a poor absorption solution from the generator to the absorber and the conduits carrying a rich absorption solution from the absorber to the generator so as to form a liquid heat exchanger. To cause a circulation of the auxiliary gas, a diaphragm in which oscillations are electromagnetically set up is employed to advantage, whereas the circulation of the liquid through the generator and absorber may be effected by a thermo-siphon arrangement with the aid of the expelled vaporous refrigerant. Air-cooling means may serve to cool the heat radiating parts. The heat may be supplied to the generator by means of an electric heating element arranged in the generator. These details are known and do not form the subject matter of the invention proper. The invention also does not require using any specific method for producing refrigeration, and may be carried out with the aid of any suitable media, for instance with ammonia as a refrigerant, water as a solvent and nitrogen as an inert gas. The essential points of the invention thus are represented by the constructional features of an absorption refrigerating apparatus consisting substantially of metal sheets united with one another. Certain auxiliary parts, for instance a pump, as well as certain connecting conduits may be separately manufactured and connected with the vessels formed of the metal sheets, as is described in the following.

In the accompanying drawings are shown two embodiments of the invention in diagrammatic form. Figs. 1 and 2 relate to the first embodiment and Figs. 3 to 6 the second embodiment. Fig. 1 shows one of the two metal sheets of the first embodiment in unfolded condition, and Fig. 2 a top view of the complete apparatus according to this embodiment. Figs. 3 and 5 show two different metal sheets employed in the second embodiment, while Figs. 4 and 6 illustrate a top view and a side elevation, respectively, of the complete apparatus according to this second embodiment. Those sections of the metal sheets which are hermetically bonded to the appertaining other sheet are cross-hatched, whereas the white spaces represent indentations and corrugations as well as some cut-out areas as identified in the following.

In the embodiment according to Figs. 1 and 2, two metal sheets as shown in Fig. 1 are placed face to face together and welded along the contacting (cross-hatched) areas. The depressions of the sheets then in registry with one another now form vessels and conduits representing a complete or nearly complete circulation system. The white areas A, B, C and D in Fig. 1 are stamped out in order to save material and to reduce the weight of the structure. The finished structure shown in Fig. 2 contains a U-shaped main portion formed by bending the metal sheets.

1 denotes the generator, 2 the corresponding gas separator and 3 the ascending conduit of the thermo-siphon arranged between the generator and the gas separator. A gas conduit 4 extends from the upper part of the gas separator 2 to the condenser 5; a liquid conduit 6 extends from the lower part of the gas separator 2 to the upper part of the absorber 7 which is provided with baffles 8 arranged in staggered relation. The lower part of the absorber 7 communicates with the generator 1 through a liquid conduit 9 which forms with the conduit 6 a heat exchanger through a pressure equalizing vessel 10 and a conduit 11. The gas separator 2 and the pressure equalizing vessel 10 communicate with each other through an air discharge conduit 12. The condensed refrigerant passes from the condenser 5 through a conduit 13 into the upper part of the evaporator 14 which is also provided with baffles 15 arranged in staggered relation. The evaporator 14 communicates with the absorber 7 through gas conduits 16, 17 forming a gas heat exchanger. Numeral 18 designates a pump which is manufactured separately from the sheet metal structure. This pump is connected with the conduit 16 by a pipe 51 and with the upper end of the absorber 7 by another pipe 19. The pump is of the type in which a diaphragm is vibrated by means of an electromagnet such as indicated by 50. Pumps of this type are known, as is apparent for instance from U. S. Patent No. 2,008,350 to Dardin et al. The gas conduits 16, 17 serve to discharge the water contained in the evaporator 14 into the liquid conduit 9 leaving the absorber at the lower end thereof. To this end, a liquid seal 20 is provided between the conduit 16 and the conduit 9. An ice cube tray 21 is associated with the evaporator 14.

The evaporator 14 which is connected to the condenser 5 through a conduit 13 is transversely arranged with respect to both limbs of the U-shaped portion. As shown by the dash and dot contours of the cabinet assembled with the refrigerating apparatus, the evaporator is arranged within the cooling chamber surrounded by the cabinet walls. The gas heat exchanger 16, 17 is placed in the insulating cabinet wall, whereas the other parts of the refrigerating apparatus are arranged at the rear side of the cabinet.

In the embodiment illustrated in Figs. 3 to 6, the refrigerating apparatus consists of two pairs of metal sheets $a$ and $b$ welded together and of a third pair of metal sheets $c$ which forms the evaporator. The portion $b$ contains only the gas heat exchanger, the portion $a$ the other parts of the refrigerating apparatus. As will be seen from Fig. 4 and Fig. 6, not only the condenser and the evaporator, but also the evaporator and the absorber on the one hand and the gas heat exchanger on the other hand communicate in this embodiment with one another through separate pipes. This simplifies the manufacture of the apparatus insofar as the repeated bending of the welded metal sheets is avoided. Otherwise the embodiment according to Figs. 3 to 6 corresponds substantially to that shown in Figs. 1 and 2.

31 denotes the generator, 32 the gas separator, 33 the ascending conduit of the thermo-siphon, 35 the condenser, 37 the absorber, 38 the pressure equalizing vessel and 39 the evaporator. The conduits 40, 41 constitute the gas heat exchanger. 42 denotes the electromagnetically operated diaphragm pump, 43 the ice cube tray associated with the evaporator, 44 the conduit extending from the condenser to the evaporator, 45 and 46 the conduits through which the gas heat exchanger 40, 41 communicates with the absorber 37. The absorption refrigerating apparatus operates in the same manner as that shown in Figs. 1 and 2.

A great advantage of the above-described type of a continuously operating absorption refrigerating apparatus is that it does away with the complicated assembling of many individual parts which in the known refrigerators must be carried out with great accuracy. The amount of material necessary is reduced to a minimum, and by the omission of many separate parts and connections a considerable saving is obtained. Such parts, particularly the conduits connecting the vessels and, which must present gradients or change their direction, may also be designed in a very simple manner. The welding together of the metal sheets does not present difficulty. Furthermore, it is not absolutely necessary to form all the vessels and conduits by depressions provided in the metal sheets; if desired, one or the other vessel may be manufactured separately and may then be connected with the main portion of the sheet metal structure by ordinary pipe connections.

What is claimed is:

1. An absorption refrigerating apparatus of the continuous type comprising a single pair of metal sheets sealed face to face together and having indentations and corrugations forming a generator vessel, a gas separator vessel, a condenser, and an absorber and interconnecting conduits.

2. An absorption refrigerating apparatus of the continuous type comprising a single pair of metal sheets sealed face to face together and having indentations and corrugations forming a generator vessel, a gas separator vessel, a condenser, an absorber, an evaporator, and interconnecting conduits arranged so as to form a circulation system, part of said conduits being arranged in heat-exchanging relationship with one another.

3. An absorption refrigerating apparatus of the continuous type having vessels forming a generator, a condenser, an absorber and an evaporator, and conduits interconnecting said vessels, which comprises a pair of metal sheets sealed face to face together and having indentations and corrugations forming a plurality of said vessels and of said conduits, said pair of sheets being bent to a U-shaped structure and having said plurality of vessels and part of said conduits arranged in the two parallel portions of said U-shaped structure, another part of said conduits being arranged in the bottom portion of said U-shaped structure between said parallel portions.

4. An absorption refrigerating apparatus of the continuous type comprising a pair of metal sheets sealed face to face together and having indentations and corrugations forming a vessel and conduit system including a generator, a gas separator, a heat exchanger, a condenser and an absorber, a second pair of indented and corrugated metal sheets also sealed face to face together and forming a heat exchanger, a sheet metal structure forming an evaporator, said second pair of sheets containing said heat exchanger being arranged between and communicating with said first pair and said evaporator structure.

5. An absorption refrigerating apparatus of the continuous type having vessels forming a generator, a condenser, an absorber and an evaporator, and conduits interconnecting said vessels, which comprises a pair of metal sheets sealed face to face together and having indentations and corrugations forming a plurality of said vessels and of said conduits, said sheets having unindented narrow areas arranged in at least one of said vessels formed by said pair of sheets, said narrow unindented areas extending alternately from two opposite sides into said vessel so as to establish a sinuous passage in said vessel, the free ends of said areas having upwardly-projecting extensions.

6. An absorption refrigerating apparatus of the continuous type, comprising a single pair of metal sheets sealed face-to-face together and having indentations and corrugations forming a generator, a condenser, an absorber and interconnecting conduits.

RUDOLF HINTZE.